US012395779B2

(12) United States Patent
Chen et al.

(10) Patent No.: US 12,395,779 B2
(45) Date of Patent: Aug. 19, 2025

(54) SPEAKER SYSTEM, SPEAKER DEVICE AND HOUSING THEREOF

(71) Applicant: Tymphany Worldwide Enterprises Limited, Grand Cayman (KY)

(72) Inventors: Kuan-Hung Chen, Grand Cayman (KY); Chih-Hsien Huang, Grand Cayman (KY)

(73) Assignee: TYMPHANY WORLDWIDE ENTERPRISES LIMITED, Grand Cayman (KY)

( * ) Notice: Subject to any disclaimer, the term of this patent is extended or adjusted under 35 U.S.C. 154(b) by 319 days.

(21) Appl. No.: 18/158,894

(22) Filed: Jan. 24, 2023

(65) Prior Publication Data

US 2023/0239606 A1 Jul. 27, 2023

(30) Foreign Application Priority Data

Jan. 25, 2022 (CN) ......................... 202210086994.8
May 23, 2022 (CN) ......................... 202210564121.3

(51) Int. Cl.
*H04R 1/22* (2006.01)
*H04R 1/02* (2006.01)
*H04R 1/28* (2006.01)

(52) U.S. Cl.
CPC ............ *H04R 1/227* (2013.01); *H04R 1/025* (2013.01); *H04R 1/288* (2013.01); *H04R 1/2896* (2013.01)

(58) Field of Classification Search
CPC ........ H04R 1/227; H04R 1/025; H04R 1/288; H04R 1/2896
USPC .......................................................... 381/335
See application file for complete search history.

(56) References Cited

U.S. PATENT DOCUMENTS

| | | | | |
|---|---|---|---|---|
| 5,388,162 A * | 2/1995 | Sohn | H04R 1/227 181/146 |
| 7,668,331 B2 * | 2/2010 | Yen | H04R 1/403 381/387 |
| 8,750,540 B2 * | 6/2014 | Tan | H04R 1/403 381/186 |
| 2017/0303034 A1 * | 10/2017 | Sullivan | H04R 1/34 |

* cited by examiner

*Primary Examiner* — David L Ton
(74) *Attorney, Agent, or Firm* — MUNCY, GEISSLER, OLDS & LOWE, P.C.

(57) ABSTRACT

A speaker system includes a first driver unit, a second driver unit and a cylinder case. The first driver unit and the second driver unit are disposed face to face with the same axial line. The axial line of the first driver unit and the axial line of the second driver unit forms a coaxial axial line or parallel axial lines. The cylinder case is hollow. The first driver unit and the second driver unit are disposed inside the cylinder case and contacts the inner wall of the cylinder case so that the central axial line of the cylinder case is parallel to the coaxial axial line or the parallel axial lines. A speak device includes a plurality of speaker systems. By the aforementioned configuration, even driver units may be disposed in a common cavity.

18 Claims, 9 Drawing Sheets

SPEAKER SYSTEM, SPEAKER DEVICE AND HOUSING THEREOF

CROSS REFERENCE TO RELATED APPLICATIONS

The present application claims priority to Chinese Patent Application No. CN 202210086994.8, which was filed on Jan. 25, 2022 and Chinese Patent Application No. CN 202210564121.3, which was filed on May 23, 2022, the entire contents of which are hereby incorporated by reference.

FIELD OF THE INVENTION

The present disclosure relates to the field of speakers, and particularly relates to a speaker system, a speaker device and a case.

BACKGROUND OF THE INVENTION

When a conventional dual speaker system is assembled, a holder for mounting driver units needs to be disassembled into two pieces (e.g., left holder and right holder). The two driver units are mounted on the left holder and the right holder respectively, and the left holder and the right holder are then combined to form the arrangement with the two driver units in opposite direction. The two driver units in opposite direction then are mounted within a speaker case to form the dual speaker system. Because the holder is combined by two parts, the two driver units cannot be coaxially arranged. The uncoaxially arrangement may be lowering the efficiency of the driver unit or generating additional vibration.

SUMMARY OF THE INVENTION

In light of the deficiency of the conventional dual speaker system, the present disclosure provides a speaker system including a first driver unit, a second driver unit and a cylinder case. The second driver unit is disposed face to face with the first driver unit, wherein the axial line of the first driver unit and the axial line of the second driver unit form a coaxial axial line or parallel axial lines. The cylinder case is hollow. The first driver unit and the second driver unit are disposed inside the cylinder case, and the central axial line of the cylinder case is parallel to the coaxial axial line or the parallel axial lines.

In some embodiments, the present disclosure comprises air channels disposed among the first driver unit, the second driver unit and the cylinder case.

In some embodiments, the first driver unit and the second driver unit are the same.

In some embodiments, the coaxial axial line or the parallel axial lines is parallel to the central axial line of the cylinder case and does not overlap the central axial line of the cylinder case.

In some embodiments, the cylinder case includes an opening.

In some embodiments, the speaker system further includes at least one fixing component which crosses and fixes the opening.

In some embodiments, the shape of the opening is a rectangle and disposed on the body of the cylinder case.

In some embodiments, the cylinder case further includes at least one support rib disposed near the opening and located inside the cylinder case, and the first driver unit and the second driver unit respectively lean against the at least one support rib.

In some embodiments, the present disclosure comprises a first buffering component disposed between the first driver unit and the at least one support rib and a second buffering component disposed between the second driver unit and the at least one support rib.

In some embodiments, any one of the at least one support rib includes a first bearing part and a second bearing part. The first bearing part is configured to bear the first driver unit and has a first acoustic outlet by which a first acoustic wave generated by the first driver unit is transmitted outwards. The second bearing part is configured to bear the second driver unit and has a second acoustic outlet by which a second acoustic wave generated by the second driver unit is transmitted outwards, wherein the first bearing part and the second bearing part are disposed on two sides of the opening.

In some embodiments, the first outlet and the second outlet are coaxially configured.

In some embodiments, the first bearing part has a first air channel, the second bearing has a second air channel and the first air channel is connected to the second air channel.

In some embodiments, the cylinder case, the first bearing part and the second bearing part are integrally formed.

In some embodiments, the speaker system further includes at least one expansion box disposed on at least one terminal of the cylinder case.

In some embodiments, the body of the cylinder case, the first bearing part and the second bearing part are integrally formed.

The present disclosure provides a speaker device including at least two said speaker system and a connection component. The connection component is connected to the at least two said speaker system.

In some embodiments, the central axial lines of the cylinder cases of the at least two said speaker system are parallel with each other or orthogonal.

The present disclosure provides a cylinder case for a speaker system including a body, a first bearing part and a second bearing part. The body has an opening. The first bearing part is configured to bear a first driver unit and has a first acoustic outlet by which a first acoustic wave generated by the first driver unit is transmitted outwards. The second bearing part is configured to bear a second driver unit and has a second acoustic outlet by which a second acoustic wave generated by the second driver unit is transmitted outwards, wherein the first bearing part and the second bearing part are disposed on two sides of the opening.

In some embodiments, the first outlet and the second outlet are coaxially configured or with parallel axis configuration.

In some embodiments, the first bearing part has a first air channel, the second bearing has a second air channel and the first air channel is connected to the second air channel.

In some embodiments, the cylinder case, the first bearing part and the second bearing part are integrally formed.

The first driver unit and the second driver unit are disposed inside the cylinder case and contacts the inner wall of the cylinder case, and the goal that the central axial line of the cylinder case is parallel to the coaxial axial line or the parallel axial lines is realized. Because the first driver unit and the second driver unit are disposed inside the cylinder case by the same reference, the coaxiality difference between the axial line of the first driver unit and the axial line of the second driver unit is decreased. The first bearing part and the second bearing part are disposed on two sides of the opening to prevent the opening from being blocked by the first bearing part and the second bearing part, and then it is prevented that the sound traveling from the opening is blocked by the first bearing part and the second bearing part.

The aforementioned description of the present disclosure is merely the outline of the technical solutions of the present disclosure in order to understand the technical solutions of the present disclosure clearly and to implement the present disclosure according to contents of specification. The better embodiments of the present disclosure given herein below with drawings are used to describe the present disclosure in detail.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

The specific embodiments of the present disclosure given herein below is used to explain the implementation of the present disclosure. A person skilled in the art easily understands the advantages and the effects of the present disclosure from the content of the present disclosure. In the following, various concepts of the invention are presented without reference to particular embodiments.

It is to be noted that the embodiments and the features in the embodiments of the present application can be combined with each other without conflict. The present invention will be described in detail below with reference to accompany drawings and in conjunction with the embodiments. In order to provide those in the art with a better understanding of the solution of the invention, the technical solutions/features in the embodiments of the invention will be described clearly and completely below in conjunction with the accompanying drawings in the embodiments of the invention, it being clear that the embodiments described are only a part of the embodiments of the disclosure and not all of them. Based on the embodiments of the present disclosure, all other embodiments obtained by a person of ordinary skill in the art shall fall within the scope of protection of the present invention.

It should be noted that the terms "first", "second", etc. in the specification and claims of the present disclosure and in the above-mentioned accompanying drawings are used to distinguish similar objects and need not be used to describe a particular order or sequence. Furthermore, the terms "comprising" and "having", and any variation thereof, are intended to encompass a non-exclusive inclusion, for example, a series of steps or units comprising processes, methods, systems, product or equipment need not be limited to those steps or units clearly listed, but may include other steps or units not clearly listed or inherent to those processes, methods, products or equipment.

Figure 1:
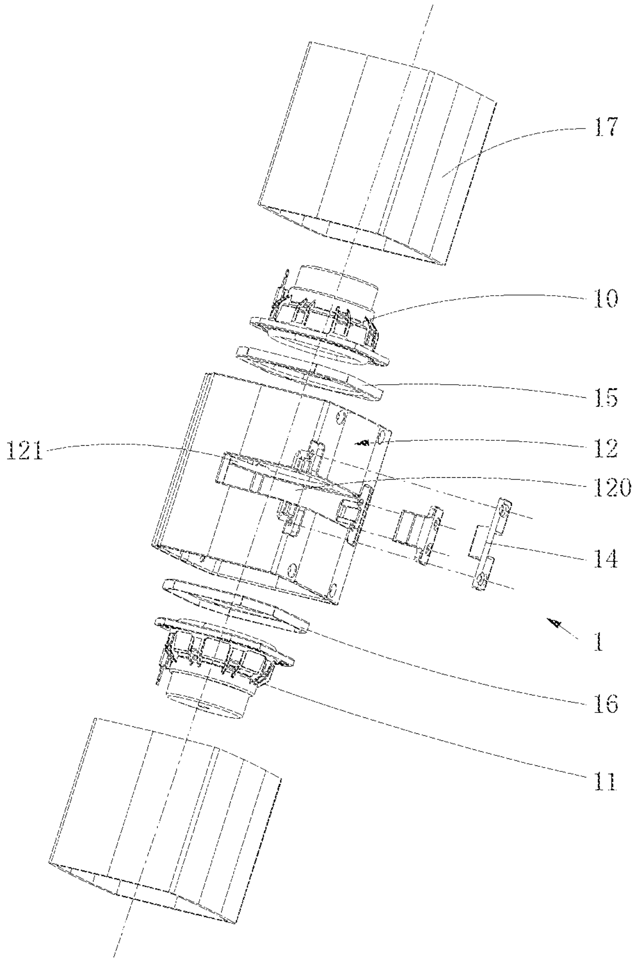
FIG. 1 is an exploded view diagram of a speaker system (with an expansion box) according to one embodiment of the present disclosure.
Figure 2:
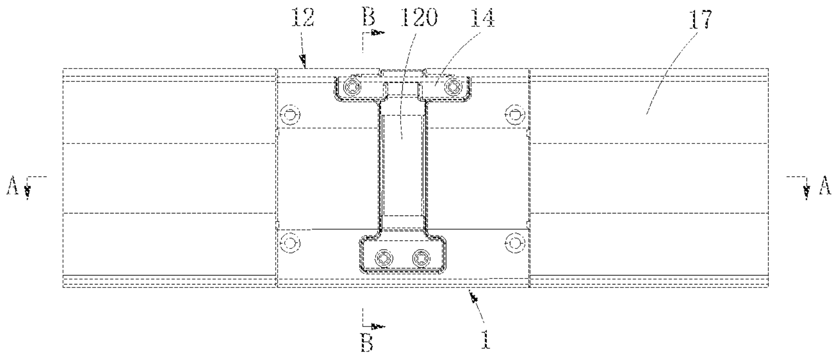
FIG. 2 is a front view diagram of a speaker system (with an expansion box) according to one embodiment of the present disclosure.
Figure 3:
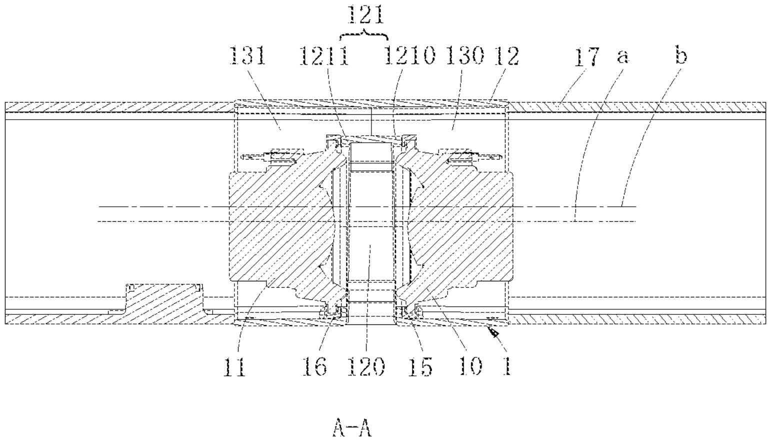
FIG. 3 is a cross section diagram cut from A-A line of FIG. 2 according to one embodiment of the present disclosure.

In one of the embodiments, referring to FIGS. 1 to 3, a speaker system 1 comprises: a first driver unit 10, a second driver unit 11 and a cylinder case 12. The second driver unit 11 is disposed face to face with the first driver unit 10, wherein the axial line of the first driver unit 10 and the axial line of the second driver unit 11 form a coaxial axial line a. The cylinder case 12 is hollow. The first driver unit 10 and the second driver unit 11 are disposed inside the cylinder case 12, and the central axial line b of the cylinder case 12 is parallel to the coaxial axial line a. For example, the first driver unit 10 and the second driver unit 11 are disposed inside the cylinder case 12 and contact the inner wall of the cylinder case 12. The central axial line b may be parallel to the coaxial axial line a by overlapping or not overlapping with each other. The sectional view of the cylinder case 12 may be rectangular, square, polygonal and circular.

Figure 4:
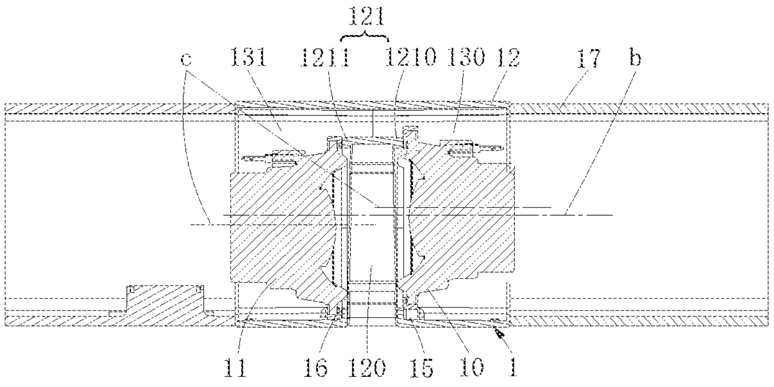
FIG. 4 is a cross section diagram of a speaker system (with an expansion box) according to the another embodiment of the present disclosure.

In another embodiment, referring to FIGS. 1, 2 and 4, a speaker system 1 comprises: a first driver unit 10, a second driver unit 11 and a cylinder case 12. The second driver unit 11 is disposed face to face with the first driver unit 10, wherein the axial line of the first driver unit 10 and the axial line of the second driver unit 11 form parallel axial lines c. The first driver unit 10 and the second driver unit 11 are disposed inside the cylinder case 12, and the central axial line b of the cylinder case 12 is parallel to the parallel axial lines c.

The first driver unit 10 and the second driver unit 11 are disposed inside the cylinder case 12 and contact the inner wall of the cylinder case 12. The reference line for assembling may be set according to the central axial line b parallel to the coaxial axial line a or to the parallel axial lines c. Accordingly, the reference line for assembling is set with the same line for both of the first driver unit 10 and the second driver unit 11, which my reduce the alignment error when assembling the speaker system 1.

Figure 5:
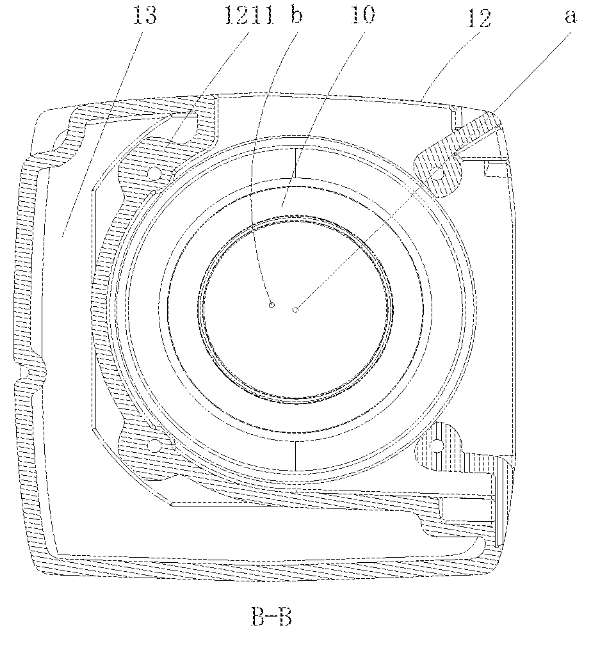
FIG. 5 is a cross section diagram cut from B-B line of FIG. 2 according to one embodiment of the present disclosure.

In another embodiment, referring to FIGS. 3 and 5, the central axial line b is not overlapping with the coaxial axial line a (but only parallel to each other). An air channel 13 is disposed among the first driver unit 10, the second driver unit 11 and the cylinder case 12. For example, the first driver unit 10 and the second driver unit 11 may be contacted with the two sides of the cylinder case 12, as shown in the sectional view of FIG. 5, and the air channel 13 goes through the other two sides of cylinder case 12.

The acoustic waves generated by the first driver unit 10 and/or the second driver unit 11 may be passed through the air channel 13 without any obstacles. Thus, the sound quality of the speaker system 1 may be improved.

Preferably, the first driver unit 10 and the second driver unit 11 are the same.

As shown in FIG. 2, the cylinder case 12 preferably comprises an opening 120.

As shown in FIG. 2, the cylinder case 12 preferably comprises at least one fixing component 14 which crosses and fixes the opening 120. For example, the fixing component 14 may be fixed on the opening 120 by screws or rivets. The fixing component 14 may be a bar-shaped component and made by metal or plastic material. Preferably, the number of the fixing component 14 may be two (2) disposed on the opening 120 with an interval. Based on the fixation of the fixing component 14, the opening 120 may keep stable and avoiding distorted when vibrating caused by the first driver unit 10 and the second driver unit 11 are generating acoustic waves.

Figure 6:
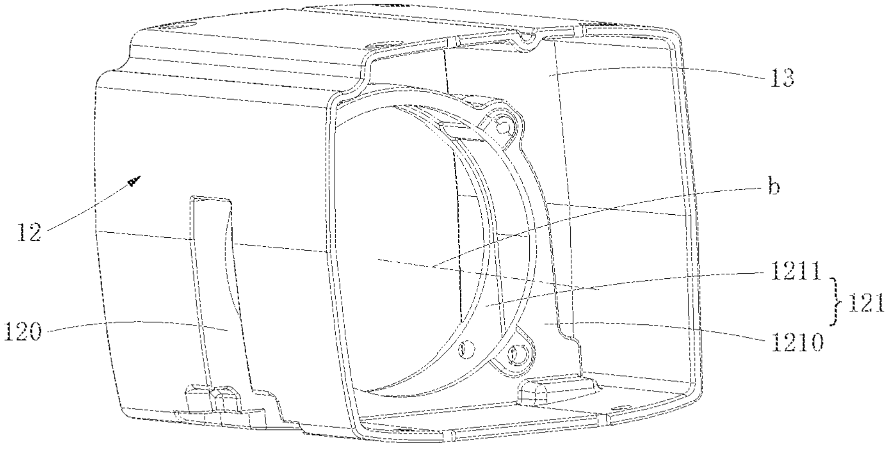
FIG. 6 is a 3D diagram of a cylinder case according to one embodiment of the present disclosure.

As shown in FIGS. 3 and 6, preferably, the opening 120 is a rectangle opening and disposed on a body of the cylinder case 12. For example, the sectional view of the cylinder case 12 is square, and the opening 120 may be disposed on two sides of the body of the cylinder case 12. The sound produced by the first driver unit 10 and the second driver unit 11 may be sent out through the opening 120. In other words, the sound may be sent out by the air channel 13 and the opening 120.

As shown in FIGS. 3 and 6, preferably, the cylinder case 12 further comprises at least one support rib 121 disposed near the opening 120 and located inside the cylinder case 121. The first driver unit 10 and the second driver unit 12 respectively lean against the at least one support rib 121. The arrangement of the support rib(s) 121 may reduce the distance that the sound transmitted from the first driver unit 10 and the second driver unit 11 to the opening 120. The first driver unit 10 and the second driver unit 11 may be fixed on the support rib(s) 121 by screw(s) or rivet(s).

As shown in FIG. 3, preferably, a first buffering component 15 is disposed between the first driver unit 10 and the at least one support rib 121, and a second buffering component 16 is disposed between the second driver unit 11 and the at least one support rib 121. The first buffering component 15 may absorb the vibration generated by the first driver unit 10, and the second buffering component 16 may absorb the vibration generated by the second driver unit 11. The material of the buffering components 15 and 16 may be rubber.

Figure 7:
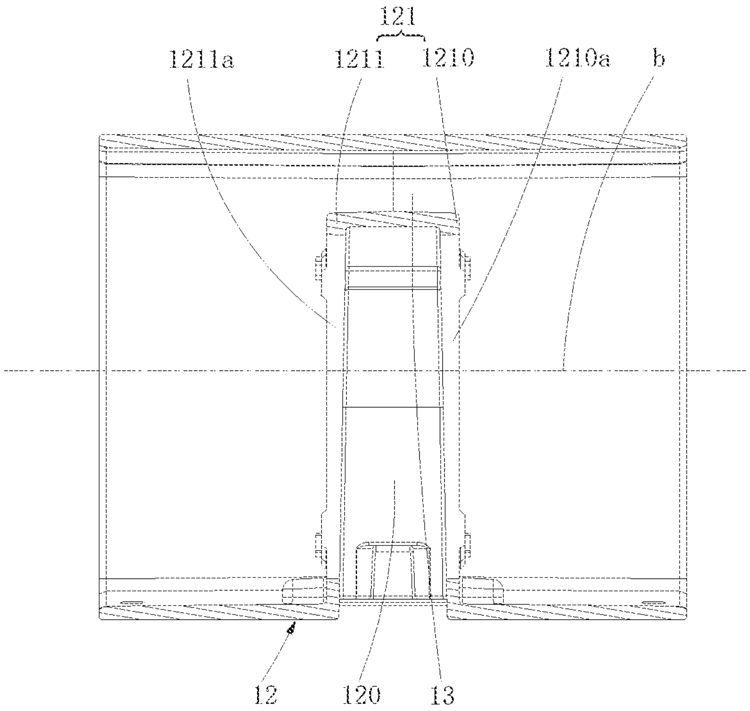
FIG. 7 is a cross section diagram of a cylinder case according to one embodiment of the present disclosure.

Referring to FIGS. 3, 6, and 7, preferably, the support rib 121 comprises: a first bearing part 1210 and a second bearing part 1211. The first bearing part 1210 is configured to bear the first driver unit 10 and having a first acoustic outlet 1210*a* by which a first acoustic wave generated by the first driver unit 10 is transmitted outwards. The first driver unit 10 may be fixed on the first bearing part 1210 by screw(s) or rivet(s). The support rib 121 may be an arc rib, and the bearing part 1210 or 1211 may be at one side of the arc rib, and the acoustic outlet 1210*a* or 1211*a* may be circular outlet. The second bearing part 1211 is configured to bear the second driver unit 11 and has a second acoustic outlet 1211*a* by which a second acoustic wave generated by the second driver unit 11 is transmitted outwards. The first bearing part 1210 and the second bearing part 1211 are respectively disposed at two sides of the opening 120 without blocking the opening 120, so the sound generated by the first driver unit 10 and the second driver unit 11 may be passing through directly.

As shown in FIG. 7, preferably, the first outlet 1210 and the second outlet 1211 are coaxially configured.

Referring to FIGS. 3 and 7, preferably, the first bearing part 1210 has a first air channel 130, the second bearing part has a second air channel 131, and the first air channel 130 is connected to the second air channel 131.

Preferably, the cylinder case 12, the first bearing part 1210 and the second bearing part 1211 are integrally formed, which may reduce production time for assembling.

Referring to FIGS. 2 and 3, preferably, the speaker system 1 further comprises at least one expansion box 17 disposed on at least one side of the cylinder case 12. The expansion box 17 may be connected to one side of the cylinder case 12 by joint, socket, magnetic, buckle, embedded, or the like. The size of the speaker system 1 may be adjusted by adding expansion box 17 at one or two sides of the cylinder case 12. Furthermore, the size and number of the expansion box 17 may be adjusted as needed. In addition, any two cylinder cases 12 may be connected to each other, which will be described below.

Figure 8:
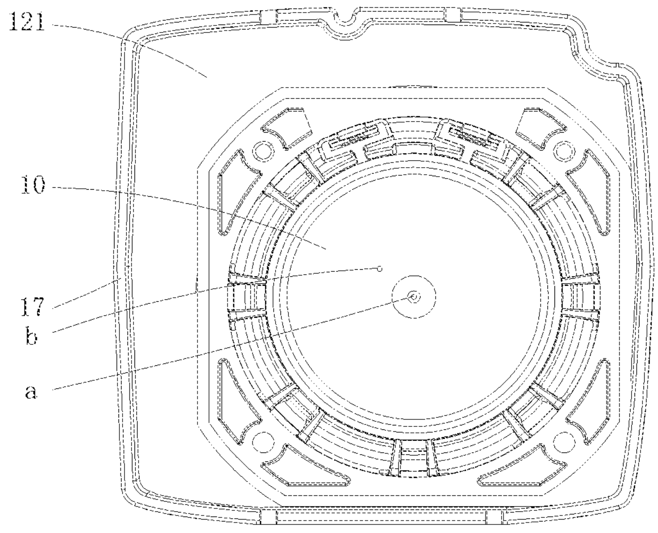
FIG. 8 is a right view diagram of a speaker system (without air channels) according to the another embodiment of the present disclosure.

In some embodiment, referring to FIGS. 3 and 8, the central axial line b is not overlapping with the coaxial axial line a, but no air channel disposed among the first driver unit 10, the second driver unit 11 and the cylinder case 12. For example, the first driver unit 10 and the second driver unit 11 may be contacted with the two sides of the cylinder case 12 directly, as shown in the sectional view of FIG. 8, and connected with the other two sides of cylinder case 12 by the support ribs 121. The internal space of the cylinder case 12 may be blocked by the support rib 121.

Figure 9:
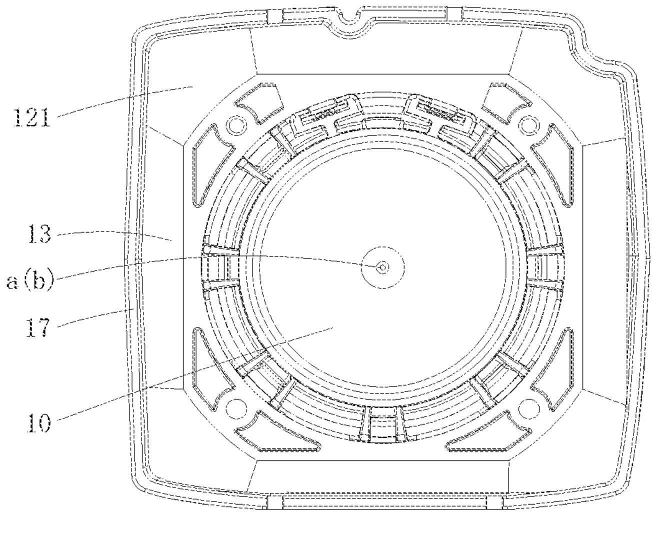
FIG. 9 is a right view diagram of a speaker system (with air channels) according to the another embodiment of the present disclosure.

In some embodiment, referring to FIGS. 1 and 9, the central axial line b is overlapping with the coaxial axial line a, and the air channel 13 disposed among the first driver unit 10, the second driver unit 11 and the cylinder case 12. For example, the first driver unit 10 and the second driver unit 11 may lean against the support ribs 121, and the air channel 13 is disposed on the support ribs 121.

Figure 10:
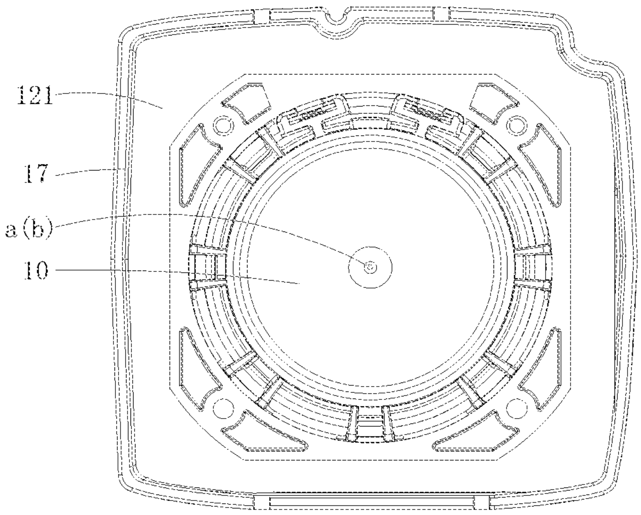
FIG. 10 is a right view diagram of a speaker system (without air channels) according to the another embodiment of the present disclosure.

In some embodiment, referring to FIGS. 1 and 10, the central axial line b is overlapping with the coaxial axial line a, but no air channel disposed among the first driver unit 10, the second driver unit 11 and the cylinder case 12. There is no air channel is disposed on the support ribs 121. The internal space of the cylinder case 12 is blocked by the support rib 121.

Figure 11:
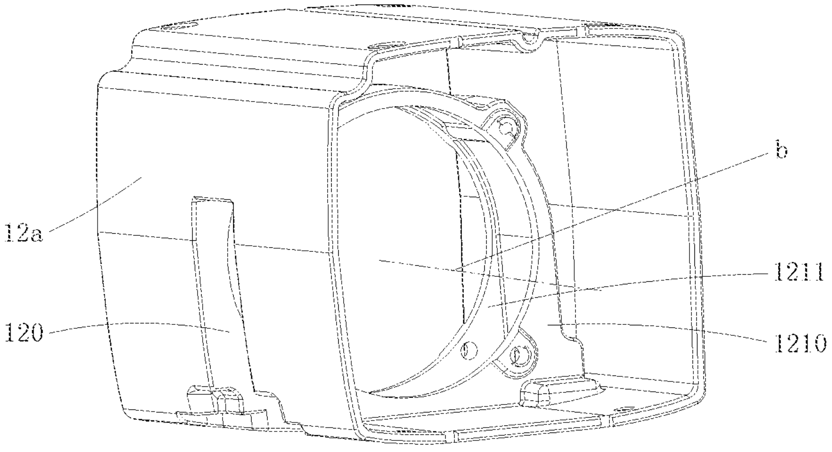
FIG. 11 is a 3D diagram of a cylinder case according to the another embodiment of the present disclosure.

Referring to FIGS. 3, 6 and 11, in another aspect, the present disclosure provides a housing for a speaker system. The housing comprises a cylinder case body 12*a*, a first bearing part 1210 and a second bearing part 1211. The cylinder case body 12*a* comprises an opening 120. The first bearing part 1210 is configured to bear the first driver unit 10 and having a first acoustic outlet 1210*a* by which a first acoustic wave generated by the first driver unit 10 is transmitted outwards. The first driver unit 10 may be fixed on the first bearing part 1210 by screw(s) or rivet(s). The support rib 121 may be an arc rib, and the bearing part 1210 or 1211 may be at one side of the arc rib, and the acoustic outlet 1210*a* or 1211*a* may be circular outlet. The second bearing part 1211 configured to bear the second driver unit 11 and having a second acoustic outlet 1211*a* by which a second acoustic wave generated by the second driver unit 11 is transmitted outwards. The first bearing part 1210 and the second bearing part 1211 are respectively disposed at two sides of the opening 120 without blocking the opening 120, so the sound generated by the first driver unit 10 and the second driver unit 11 may be passing through directly.

Preferably, the cylinder case body 12*a*, the first bearing part 1210 and the second bearing part 1211 are integrally formed.

Figure 12:
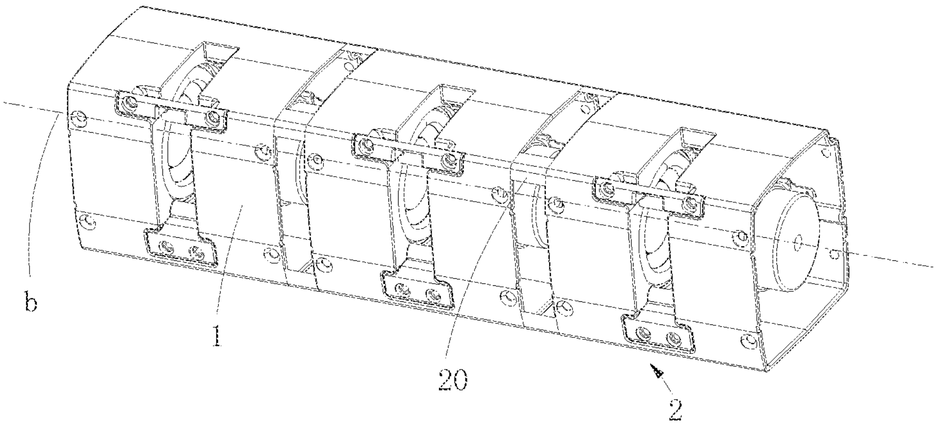
FIG. 12 is a 3D diagram (three speaker systems are placed horizontally) of a speaker device according to one embodiment of the present disclosure.

In another aspect, the present disclosure provides a speaker device 2. As shown in FIG. 12, the speaker device 2 comprises three speaker systems 1 and connection components 20 connecting the three speaker systems 1. The central axial lines b of the speaker systems 1 are overlapping. In this embodiment, the number of the connection components 20 may be twelve (12). Four (4) connection components 20 are disposed on for corners of the cylinder case 12. Accordingly, three speaker systems 1 may be connected to each other by the connection components 20. Each connection component 20 may be fixed on the cylinder case 12 by screw(s) or rivet(s).

Figure 13:
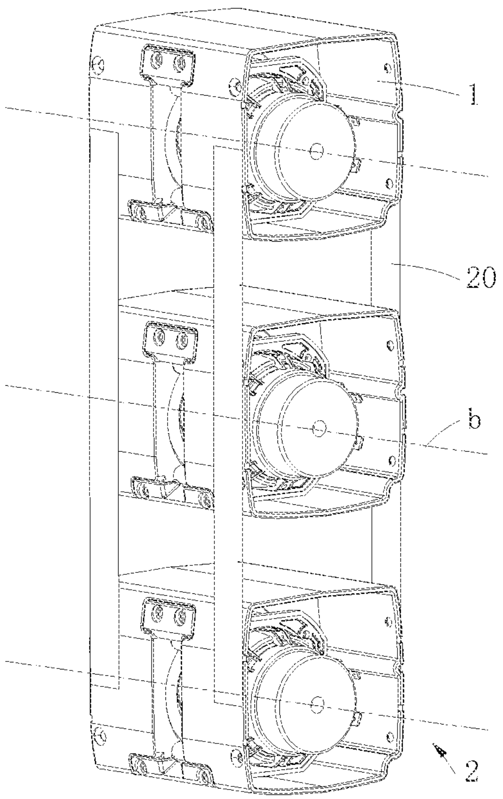
FIG. 13 is a 3D diagram (three speaker systems are placed vertically) of a speaker device according to one embodiment of the present disclosure.

In some embodiments, as shown in FIG. 13 the speaker device 2 comprises three speaker systems 1 and connection components 20 connecting the three speaker systems 1. This embodiment is similar to the embodiment illustrated in FIG. 12, but the central axial lines b of the speaker systems 1 are parallel to each other.

Figure 14:
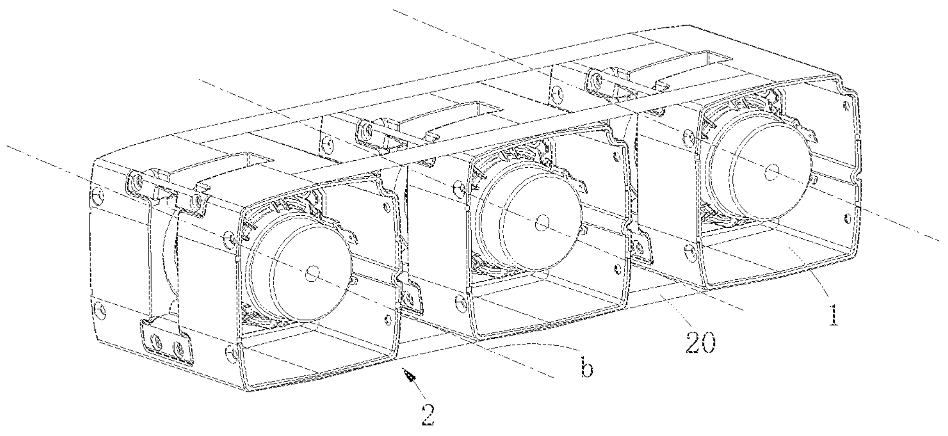
FIG. 14 is a 3D diagram (three speaker systems are placed horizontally) of a speaker device according to the another embodiment of the present disclosure.

In some embodiments, as shown in FIG. 14 the speaker device 2 comprises three speaker systems 1 and connection components 20 connecting the three speaker systems 1. This embodiment is also similar to the embodiment illustrated in FIG. 12, but the central axial lines b of the speaker systems 1 are parallel to each other.

Figure 15:
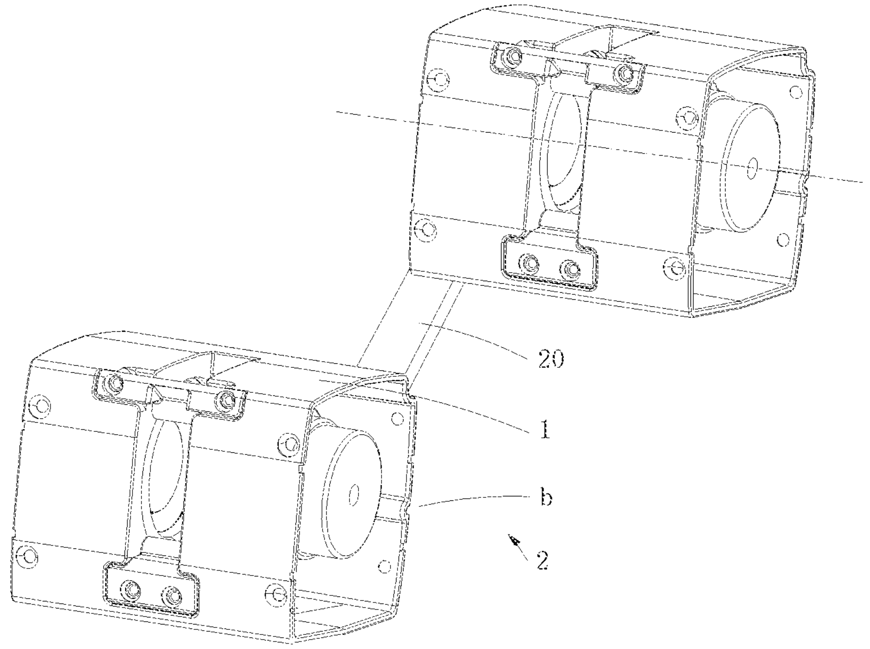
FIG. 15 is a 3D diagram (two speaker systems) of a speaker device according to one embodiment of the present disclosure.

In some embodiments, as shown in FIG. 15 the speaker device 2 comprises two speaker systems 1 and one connection component 20 connecting the two speaker systems 1. The central axial lines b of the speaker systems 1 are parallel to each other. The connection component 20 connects one corner of the speaker system 1 to one corner of the other speaker system 1.

Figure 16:
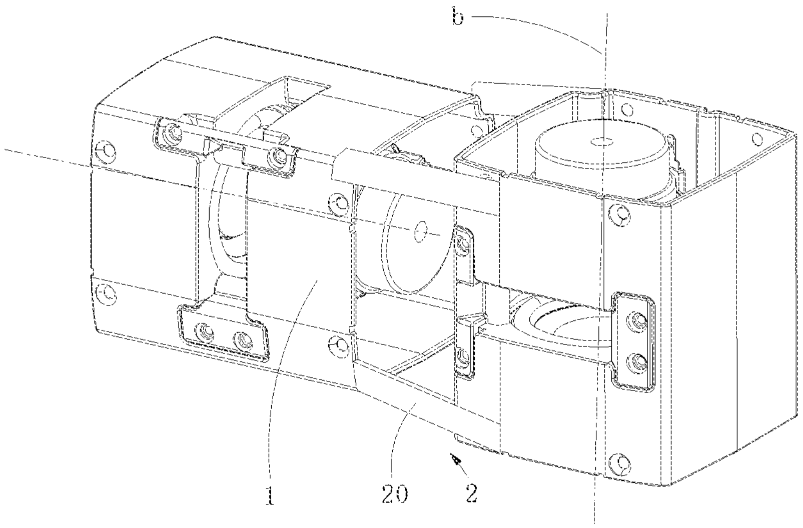
FIG. 16 is a 3D diagram (two speaker systems) of a speaker device according to the another embodiment of the present disclosure.

In some embodiments, as shown in FIG. 16 the speaker device 2 comprises two speaker systems 1 and four connection components 20 connecting the two speaker systems 1. The central axial lines b of the speaker systems 1 are orthogonal to each other. In this embodiment, the four connection components 20 may connects four corners of one speaker system 1 to another speaker system 1.

The embodiments above are only used to describe the technical concept and features of the present invention, and are intended to enable a person skilled in the art to understand the content of the present invention and implement according thereto, but not to limit the patent scope of the present invention. All the equivalent variations and modifications made in the spirit of the present invention shall still be concluded in the patent scope of the present invention, which is defined by the claims.

LIST OF REFERENCE SIGNS

1: speaker system
10: first driver unit
11: second driver unit
a: coaxial axial line
c: parallel axial lines
12: cylinder case
b: central axial line
12*a*: body
120: opening
121: support rib
1210: first bearing part
1210*a*: first acoustic outlet
1211: second bearing part
1211*a*: second acoustic outlet
13: air channel
130: first air channel
131: second air channel
14: fixing component
15: first buffering component
16: second buffering component
17: expansion box
2: speaker device
20: connection component

The invention claimed is:

1. A speaker system comprising:
a first driver unit;
a second driver unit disposed face to face with the first driver unit, wherein an axial line of the first driver unit and an axial line of the second driver unit forms a coaxial axial line or parallel axial lines; and
a hollow cylinder case, wherein the first driver unit and the second driver unit are disposed inside the cylinder case, and a central axial line of the cylinder case is parallel to the coaxial axial line or the parallel axial lines,
wherein the coaxial axial line or the parallel axial lines is parallel to the central axial line of the cylinder case and does not overlap with the central axial line of the cylinder case.

2. The speaker system according to claim 1, wherein an air channel is disposed among the first driver unit, the second driver unit and the cylinder case.

3. The speaker system according to claim 1, wherein the first driver unit and the second driver unit are the same.

4. The speaker system according to claim 1, wherein the cylinder case comprises an opening.

5. The speaker system according to claim 4, further comprising at least one fixing component which crosses and fixes the opening.

6. The speaker system according to claim 4, wherein the opening is a rectangle opening and disposed on a body of the cylinder case.

7. The speaker system according to claim 4, wherein the cylinder case further comprises at least one support rib disposed near the opening and located inside the cylinder case, and the first driver unit and the second driver unit respectively lean against the at least one support rib.

8. The speaker system according to claim 7, wherein a first buffering component is disposed between the first driver unit and the at least one support rib, and a second buffering component is disposed between the second driver unit and the at least one support rib.

9. The speaker system according to claim 7, wherein any one of the at least one support rib comprises:

a first bearing part configured to bear the first driver unit and having a first acoustic outlet by which a first acoustic wave generated by the first driver unit is transmitted outwards; and a second bearing part configured to bear the second driver unit and having a second acoustic outlet by which a second acoustic wave generated by the second driver unit is transmitted outwards, wherein the first bearing part and the second bearing part are disposed on two sides of the opening.

10. The speaker system according to claim 9, wherein the first outlet and the second outlet are coaxially configured.

11. The speaker system according to claim 9, wherein the first bearing part has a first air channel, the second bearing part has a second air channel, and the first air channel is connected to the second air channel.

12. The speaker system according to claim 9, wherein the cylinder case, the first bearing part and the second bearing part are integrally formed.

13. The speaker system according to claim 1, further comprising at least one expansion box disposed on at least one side of the cylinder case.

14. A speaker device comprising:

at least two speaker systems according to claim 1; and a connection component connected to the at least two speaker systems.

15. The speaker device according to claim 14, wherein the central axial lines of the cylinder cases of the at least two speaker systems are parallel or orthogonal to each other.

16. A housing for a speaker system comprising:

a cylinder case body having an opening;

a first bearing part configured to bear a first driver unit and having a first acoustic outlet by which a first acoustic wave generated by the first driver unit is transmitted outwards; and a second bearing part configured to bear a second driver unit and having a second acoustic outlet by which a second acoustic wave generated by the second driver unit is transmitted outwards, wherein the first bearing part and the second bearing part are disposed on two sides of the opening, wherein the first outlet and the second outlet are coaxially configured.

17. The housing according to claim 16, wherein the first bearing part has a first air channel, the second bearing has a second air channel, and the first air channel is connected to the second air channel.

18. The housing according to claim 16, wherein the cylinder case, the first bearing part and the second bearing part are integrally formed.

* * * * *